United States Patent [19]

Takarada et al.

[11] Patent Number: 5,624,977
[45] Date of Patent: Apr. 29, 1997

[54] THERMOPLASTIC FLUOROSILICONE RESIN AND METHOD OF MAKING

[75] Inventors: Mitsuhiro Takarada; Yoshiteru Kobayashi; Takashi Kondou, all of Gunma-ken, Japan

[73] Assignee: Shin-Etsu Chemical Co., Ltd., Tokyo, Japan

[21] Appl. No.: 352,073

[22] Filed: Nov. 30, 1994

[30] Foreign Application Priority Data

Dec. 7, 1993 [JP] Japan .................... 5-340046

[51] Int. Cl.$^6$ .................... C08K 9/10; C08L 83/00
[52] U.S. Cl. .................... 523/211; 524/588; 528/43; 528/15; 528/42; 528/39; 556/450; 556/460; 556/461; 428/402.21
[58] Field of Search .................... 523/211; 524/588; 528/43, 15, 42, 39; 428/402.21; 556/450, 460, 461

[56] References Cited

U.S. PATENT DOCUMENTS

| | | | |
|---|---|---|---|
| 4,784,879 | 11/1988 | Lee et al. | 427/213.34 |
| 4,874,667 | 10/1989 | Lee et al. | 428/402.22 |
| 5,009,957 | 4/1991 | Lee et al. | 428/402.22 |
| 5,494,750 | 2/1996 | Fujioka et al. | 428/402.21 |

FOREIGN PATENT DOCUMENTS

| | | |
|---|---|---|
| 0347895 | 12/1989 | European Pat. Off. . |
| 0543410 | 5/1993 | European Pat. Off. . |
| 63-213575 | 9/1988 | Japan . |
| 01051140 | 2/1989 | Japan . |
| 01047442 | 2/1989 | Japan . |
| 02004833 | 1/1990 | Japan . |
| 04323223 | 11/1992 | Japan . |
| 05002282 | 1/1993 | Japan . |

OTHER PUBLICATIONS

Japanese Abstract JP 4323223.

*Primary Examiner*—Melvyn I. Marquis
*Assistant Examiner*—Karen A. Dean
*Attorney, Agent, or Firm*—Birch, Stewart, Kolasch & Birch, LLP

[57] ABSTRACT

Provided is a thermoplastic fluorosilicone resin of the average compositional formula (1):

$$(RfCH_2CH_2SiO_{3/2})_x(C_6H_5SiO_{3/2})_y(SiO_2)_z \qquad (1)$$

wherein Rf is a perfluoroalkyl group having 1 to 10 carbon atoms, and x, y, and z are $0.2 \leq x \leq 0.95$, $0 < y \leq 0.8$, $0 \leq z \leq 0.05$, and $x+y+z=1$ and having a softening point of 50°–200° C. The fluorosilicone resin is useful for microcapsulating a platinum catalyst for prolonging the pot life of an addition type organopolysiloxane composition and can be used as a coating agent for forming a weather resistant, stainproof, water repellent coating.

6 Claims, No Drawings

THERMOPLASTIC FLUOROSILICONE RESIN AND METHOD OF MAKING

BACKGROUND OF THE INVENTION

1. Field of the Invention

This invention relates to a thermoplastic fluorosilicone resin which is useful as a resin for microcapsulating platinum catalysts, a coating agent for car wax, and an additive for engineering plastics. It also relates to a method for preparing the same.

2. Prior Art

Conventional vehicles used for heat resistant paint and weather resistant paint include silicone resins containing a silanol or alkoxysilyl group as a functional group and having compositions: $CH_3SiO_{3/2}$, $C_6H_5SiO_{3/2}$, $(C_6H_5SiO_{3/2}).[(CH_3)_2SiO]$, and $(C_6H_5SiO_{3/2}).(n-C_3H_7SiO_{3/2})$. Since these conventional silicone resins are thermosetting, the paint compositions can gel with the lapse of time.

It is also known to add these resins to thermoplastic molding resins for improving mold release, flame retardancy and moldability. However, addition of thermosetting silicone resins is not recommended for those resins having high molding temperatures. In this regard, Japanese Patent Application Kokai (JP-A) No. 2282/1993 proposes a thermoplastic silicone resin in which residual silanol groups are capped.

For stabilizing platinum-catalyzed addition type silicone compositions during storage, JP-A 4833/1990 proposes to micro-capsulate a platinum catalyst by carrying the platinum catalyst on a thermoplastic silicone resin as mentioned above, comminuting the resin into a microparticulate powder, and washing the particulates with methanol to remove the platinum catalyst from the outer surface. Since this silicone resin, however, is soluble in vinylmethylpolysiloxane and methylhydrogen-polysiloxane, it is less effective for providing storage stability, especially in the summer season even if its softening point is elevated.

For the purpose of reducing solubility in vinylmethylpolysiloxane and methylhydrogen-polysiloxane, JP-A 323223/1992 proposes a thermoplastic silicone resin of the formula: $(CF_3CH_2CH_2SiO_{3/2})_n.((CH_3)_2SiO)_m$. Since this resin, however, has a low softening point due to inclusion of a D unit, storage stability is little improved. By reducing the value of m, the softening point can be increased, but at the sacrifice of compatibility with organic solvents. Then diethyl ether, Freon 113 and other industrially undesirable solvents are necessary in order to blend a platinum catalyst with the resin in a solution form.

For preparing microcapsulated platinum catalysts which are insoluble in vinylmethyl-polysiloxane and methylhydrogenpolysiloxane, JP-A 47442/1989 and 51140/1989 propose to use ethylenic polymers such as acrylic resin, polyvinyl alcohol, and styrene-acrylonitrile copolymers. While these vinyl polymers are substantially insoluble in siloxanes, there occurs a problem that when cured moldings are heated, the vinyl polymers can be pyrolyzed to partially discolor the moldings.

With respect to car wax resins, Japanese Patent Publication (JP-B) No. 58305/1990 propose to cure a methylated silicone resin with an organic titanate or organic tin catalyst to thereby form water repellent coatings. However, some functional groups (e.g., silanol or alkoxysilyl groups) are left in these silicone coatings. The coatings tend to lose gloss with the lapse of time because contaminants can attach to the silanol or alkoxysilyl groups. Moreover, the methylated silicone resin is fully water repellent, but weak to acid rain.

There is a need for a car wax resin having acid resistance and stain resistance.

SUMMARY OF THE INVENTION

The inventors have found that by effecting co-hydrolysis of three organic silicon compounds of the following general formulae (2), (3) and (4) or partial hydrolyzates thereof in a molar ratio of x:y:z and polymerizing the co-hydrolyzate, there is obtained a thermoplastic fluorosilicone resin of the following average compositional formula (1) having a softening point of 50° to 200° C.

$$RfCH_2CH_2SiX_3 \quad (2)$$

$$C_6H_5SiX_3 \quad (3)$$

$$SiX_4 \quad (4)$$

↓

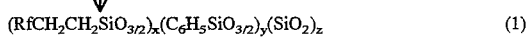

$$(RfCH_2CH_2SiO_{3/2})_x(C_6H_5SiO_{3/2})_y(SiO_2)_z \quad (1)$$

In the formulae, Rf is a perfluoroalkyl group having 1 to 10 carbon atoms, X is a halogen atom or an alkoxy group having 1 to 6 carbon atoms, and letters x, y, and z are positive numbers in the range: $0.2 \leq x \leq 0.95$, $0 < y \leq 0.8$, $0 \leq z \leq 0.05$, and $x+y+z=1$.

The thermoplastic fluorosilicone resin of formula (1) having a softening point of 50° to 200° C. is blended with a platinum catalyst in an organic solvent and spray dried before it is added to a platinum-catalyzed addition type curable composition. Since the resin is substantially insoluble in vinylmethylpoly-siloxane and methylhydrogenpolysiloxane, the composition experiences little increase of viscosity even after storage at room temperature over about one month. That is, the composition is satisfactorily storage stable. In addition, the inventive resin is also effective as a lustering and water repellent agent for car wax. Especially the inventive resin having a high softening point is highly resistant against staining and weathering. Since a suitable amount of a perfluoroalkyl group is contained, the resin has higher water repellency, higher acid resistance and a greater contact angle with water than the methylated silicone resins.

Therefore, the present invention provides a thermoplastic fluorosilicone resin having the following average compositional formula (1):

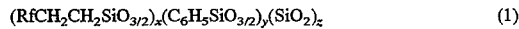

$$(RfCH_2CH_2SiO_{3/2})_x(C_6H_5SiO_{3/2})_y(SiO_2)_z \quad (1)$$

wherein Rf, x, y, and z are as defined above and having a softening point in the range of 50 to 200° C.

In another aspect, the present invention provides a method for preparing a thermoplastic fluorosilicone resin of formula (1) by effecting co-hydrolysis of a first organic silicon compound of formula (2):

$$RfCH_2CH_2SiX_3 \quad (2)$$

or a partial hydrolyzate thereof, a second organic silicon compound of formula (3):

$$C_6H_5SiX_3 \quad (3)$$

or a partial hydrolyzate thereof, and a third organic silicon compound of formula (4):

$$SiX_4 \quad (4)$$

or a partial hydrolyzate thereof in a molar ratio x: y: z, and polymerizing the co-hydrolyzate wherein Rf, X, x, y and z are as defined above.

DETAILED DESCRIPTION OF THE INVENTION

The thermoplastic fluorosilicone resin of the present invention is represented by the following average compositional formula (1):

$$(RfCH_2CH_2SiO_{3/2})_x(C_6H_5SiO_{3/2})_y(SiO_2)_z \quad (1)$$

In the $RfCH_2CH_2SiO_{3/2}$ unit, Rf is a perfluoroalkyl group having 1 to 10 carbon atoms, which is represented by $C_nF_{2n+1}$ wherein n is an integer of 1 to 10. This perfluoroalkyl group is an essential substituent for rendering the resin incompatible with methylated polysiloxanes. The perfluoroalkyl group is also effective for imparting mold release, water repellency and lubricity. The content of perfluoroalkyl group in the resin is expressed by a molar ratio x which ranges from 0.2 to 0.95, especially from 0.5 to 0..9. If x is less than 0.2, undesirably the resin is well compatible with methylated polysiloxanes and forms a coating which is less water repellent and less releasable from the mold. If x is more than 0.95, the resin has a lower softening point. Even when a $SiO_2$ unit is introduced, the softening point does not exceed 50° C. insofar as the resin is produced by the method of the invention.

The resin of the invention further contains a $C_6H_5SiO_{3/2}$ unit in a content y which is in the range: $0 < y \leq 0.8$, preferably $0.1 \leq y \leq 0.5$. The phenyl group is essential for controlling the softening point of the resin. If the content of this unit in the resin, y, exceeds 0.8, undesirably the resin becomes compatible with methylated polysiloxanes.

Further the resin of the invention may contain a $SiO_2$ unit for the purpose of increasing the softening point of the resin. The content of $SiO_2$ unit in the resin is represented by z which ranges from 0 to 0.05. If z exceeds 0.05, the resin has a too high softening point and can gel when the solvent used in reaction is heated and distilled off.

It is understood that x, y and z represent molar ratios and amount to unity, that is, $x+y+z=1$.

The resin of the invention has a softening point in the range of 50° to 200° C., preferably 70° to 150° C. If the softening point is lower than 50° C., the resin is poor in storage stability when a platinum catalyst is microcapsulated with the resin, or forms a too soft, stain receptive coating when used as a coating agent, which suggests that the resin is unsuitable for car wax application. If the resin has a softening point in excess of 200° C., there arises a problem that when a platinum catalyst is microcapsulated with the resin and added to an addition type organopolysiloxane composition, the platinum catalyst is retarded from leaching out, resulting in short curing.

The thermoplastic fluorosilicone resin of the invention is soluble in methylene chloride, methyl ethyl ketone and methyl isobutyl ketone, but insoluble in toluene, hexane, and silicone oil.

Preferably the resin has a molecular weight of about 1,000 to 100,000 as calculated on a polystyrene basis. The molecular weight preferably ranges from about 2,000 to about 50,000 in controlling the softening point of 50° to 200° C. An average molecular weight of less than 1,000 would lead to a softening point below 50° C. whereas an average molecular weight of more than 100,000 would lead to a softening point above 200° C. so that the resin may be less soluble in methylated polysiloxanes when heated.

According to the present invention, the resin of formula (1) is prepared by effecting co-hydrolysis of organic silicon compounds of formula (2), (3) and (4) or partial hydrolyzates thereof in a molar ratio x:y:z wherein x, y and z are as defined above and polymerizing the co-hydrolyzate.

$$RfCH_2CH_2SiX_3 \quad (2)$$

$$C_6H_5SiX_3 \quad (3)$$

$$SiX_4 \quad (4)$$

In the formula, Rf is as defined above, and X is a halogen atom or an alkoxy group having 1 to 6 carbon atoms, preferably the alkoxy group.

Examples of the organic silicon compound of formula (2): $RfCH_2CH_2SiX_3$ or partial hydrolyzate thereof include $CF_3CH_2CH_2SiCl_3$, $CF_3CH_2CH_2Si(OCH_3)_3$, $CF_3CH_2CH_2Si(OC_2H_5)_3$, $C_4F_9CH_2CH_2SiCl_3$, $C_4F_9CH_2CH_2Si(OCH_3)_3$, $C_4F_9CH_2CH_2Si(OC_2H_5)_3$, $C_8F_{17}CH_2CH_2SiCl_3$, $C_8F_{17}CH_2CH_2Si(OCH_3)_3$, and $C_8F_{17}CH_2CH_2Si(OC_2H_5)_3$.

Included in the organic silicon compound of formula (3): $C_6H_5SiX_3$ or partial hydrolyzate thereof are the following examples.

$C_6H_5SiCl_3$, $C_6H_5Si(OCH_3)_3$, $C_6H_5Si(OC_2H_5)_3$,

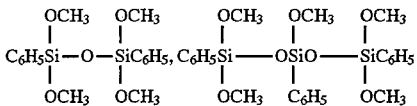

Examples of the organic silicon compound of formula (4): $SiX_4$ or partial hydrolyzate thereof include $SiCl_4$, $Si(OCH_3)_4$, $Si(OC_2H_5)_4$, methyl polysilicate, and ethyl polysilicate.

When hydrolysis is carried out using chlorosilanes of formulae (2) to (4) wherein X is a chlorine atom as the starting materials, subsequent polymerization can take place without a catalyst because the hydrochloric acid by-product resulting from hydrolysis can be a catalyst. On hydrolysis, use of a solvent is effective. The useful solvent is selected from hydrocarbon solvents such as toluene, xylene, hexane, heptane, and octane and chlorinated solvents such as methylene chloride, chloroform, trichloroethylene, and perchloroethylene. It is also effective to use a polar solvent as a co-solvent during hydrolysis. Such polar solvents include methanol, ethanol, isopropyl alcohol, isobutyl alcohol, acetone, methyl ethyl ketone, methyl isobutyl ketone, diethyl ether, dibutyl ether, and tetrahydrofuran.

When alkoxysilanes of formulae (2) to (4) wherein X is an alkoxy group or partial hydrolyzates thereof are used as the starting materials, it is recommended to prepare the inventive resin by effecting hydrolysis in the above-mentioned organic solvent in the presence of an acid catalyst, neutralizing the acid or washing away the acid with water, and subsequently effecting polymerization in the presence of a basic catalyst. The acid catalysts used herein include hydrochloric acid, sulfuric acid, methanesulfonic acid, acetic acid, formic acid, oxalic acid, trifluoro-methanesulfonic acid, toluenesulfonic acid, and para-toluenesulfonic acid. The basic catalysts used herein include triethylamine, sodium acetate, sodium hydroxide, potassium hydroxide, potassium siliconate, and pyridine. These catalysts are preferably used in amounts of about 0.5 to 10% by weight of the siloxanes. At the end of the respective reactions, the catalysts are preferably removed by neutralizing with an equimolar amount of a neutralizing agent or washing with water. For hydrolysis and polymerization, a temperature from room temperature to about 120° C. is appropriate.

As mentioned above, the fluorosilicone resin of the invention has a softening point of 50° to 200° C. which can be controlled by a proper choice of a polymerization time, the siloxane concentration during hydrolysis, the content of $SiO_2$ unit and other factors.

In the practice of the invention, the fluorosilicone resin obtained by the above-mentioned method may be silylated with hexamethyldisilazane, trimethyloximesilane or the like for the purpose of capping silanol groups remaining in the resin. This capping is effective particularly when the residual silanol groups and hydrogenpolysiloxane can be dehydrogenated in the presence of a platinum catalyst, especially for those resins having a higher softening point. The capping is effective for lowering the softening point of the resin and thus preventing the resin from gelation.

Preferably the silylating agent used for this capping is an organic silicon compound of the following formula (5):

$(CH_3)_3SiY$ (5)

wherein Y is a halogen atom, amino group, dimethylamino group, diethylamino group, methyl ethyl ketoxime group, isopropenyloxy group, or acetoxy group. Examples are given below.

trimethylchlorosilane,
hexamethyldisilazane, $Me_3SiNMe_2$,
$Me_3SiNEt_2$, $Me_3SiOOCMe_3$,

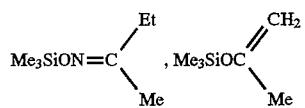

Among these, hexamethyldisilazane and $Me_3SiNMe_2$ have the highest silylating ability and are efficient.

The capping or silylating step may be carried out in a conventional manner. For example, the resin obtained by hydrolysis and polymerization according to the aforementioned method is subject to HY-removal reaction in a solventless system at room temperature. Alternatively, the resin is dissolved in a halogenated solvent such as methylene chloride, trichloroethylene and Freon solvents and subject to HY-removal reaction under reflux of the solvent. Note that Y is an organic group as previously defined.

The fluorosilicone resin of the invention is advantageously used for microcapsulating platinum catalysts. With the platinum catalyst carried on the inventive resin, an addition type organopolysiloxane composition can have a pot life in excess of one month even during the summer season. The platinum catalyst often used herein include chloroplatinic acid, zero valence platinum catalysts having vinylsiloxane coordinated thereto, and neutral platinum catalysts obtained by neutralizing chloro-platinic acid with basic compounds to remove chlorine. The platinum catalyst is preferably carried on the inventive resin in an amount of about 1 to 50,000 ppm, more preferably about 5 to 10,000 ppm of platinum atom. The addition type organopolysiloxane composition may be comprised of conventional amounts of well-known components.

Additionally the resin of the invention is useful as a coating agent for car wax or the like for forming a coating having improved acid resistance, weather resistance, stainproof and water repellency. The resin is also useful as an additive for engineering plastics for improving mold release property and pigment dispersion. The resin finds further use as a plasticizer for shrinkable tube-forming fluoro-olefinic resins.

There has been described a fluorosilicone resin which is useful as a resin for micro-capsulating a platinum catalyst for prolonging the pot life of an addition type organopolysiloxane composition and which can be used as a coating agent for forming a weather resistant, stainproof, water repellent coating. The method for the invention is efficient and simple to produce the resin.

EXAMPLE

Examples of the present invention are given below together with Comparative Examples by way of illustration and not by way of limitation. All parts are by weight.

EXAMPLE 1

To a mixture of 175 parts (1 mol of Si) of a compound of formula (a), 218 parts (1 mol of Si) of a compound of formula (b), 280 parts of methyl isobutyl ketone, and 13.9 parts of methanesulfonic acid at room temperature, 180 parts of water was added dropwise over 30 minutes. The mixture was heated for reflux at 75° C. for 2 hours. After cooling, 33 parts of triethylamine was added to the mixture, which was heated again for reflux at 75° C. for a further 2 hours. After cooling, 45 parts of citric acid was added to the mixture, which was stirred at room temperature for one hour. Subsequent water washing and solvent distillation yielded a silicone resin A.

Resin A had a softening point of 110° C. and a silanol content of 0.5% by weight. By NMR and IR analysis, it was identified to have the following compositional formula (A).

Source (a)

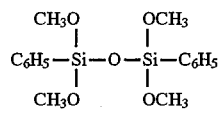

Source (b)

$CF_3CH_2CH_2Si(OCH_3)_3$

Resin A $(CF_3CH_2CH_2SiO_{3/2})_{0.5}(C_6H_5SiO_{3/2})_{0.5}$ (A)

A mixture of 0.1 gram of Resin A and 99.9 grams of dimethylpolysiloxane having a viscosity of 10,000 centistokes at 25° C. (KF-96 commercially available from Shin-Etsu Chemical Co., Ltd.) was stirred at 20°–25° C. for 24 hours to find that the resin was not uniformly dissolved and the mixture remained semi-suspended.

EXAMPLE 2

A silicone resin B was prepared by the same procedure as in Example 1 except that 218 parts of the compound of formula (b) was replaced by a mixture of 209 parts of the compound of formula (B) and 6.1 parts of tetramethoxysilane $Si(OCH_3)_4$.

Resin B had a softening point of 118° C. and a silanol content of 0.3% by weight. By NMR and IR analysis, it was identified to have the following compositional formula (B). Like Resin A, Resin B was insoluble in dimethylpolysiloxane having a viscosity of 10,000 centistokes.

Resin B $(CF_3CH_2CH_2SiO_{3/2})_{0.48}(C_6H_5SiO_{3/2})_{0.5}(SiO_2)_{0.02}$ (B)

EXAMPLE 3

Resin B obtained in Example 2 was dissolved in methylene chloride and treated with hexamethyldisilazane for trimethylsilylating residual silanol groups, obtaining a resin C.

Resin C had a softening point of 105° C. and contained no detectable silanol group. It had substantially the same compositional formula as Resin B on analysis and was insoluble in the dimethylpolysiloxane.

EXAMPLE 4

A silicone resin D was prepared by the same procedure as in Example 1 except that the amount of the compound of formula (a) was changed to 70 parts and the amount of the compound of formula (b) was changed to 349 parts.

Resin D had a softening point of 74° C. and contained 0.3% by weight of a silanol group. On NMR and IR analysis, it was identified to have the following compositional formula (D). It was insoluble in the dimethylpolysiloxane.

Resin D $$(CF_3CH_2CH_2SiO_{3/2})_{0.8}(C_6H_5SiO_{3/2})_{0.2} \quad (D)$$

COMPARATIVE EXAMPLE 1

A mixture of 148 parts of triphenyl-chlorosilane, 53 parts of propyltrichlorosilane, and 200 parts of toluene was added dropwise to 100 parts of isopropyl alcohol and 500 parts of water at room temperature over about 2 hours. The mixture was aged at 70° C. for 30 minutes, washed with water, and distilled to remove toluene, obtaining a silicone resin E having a softening point of 75° C. and a silanol content of 4.0% by weight. Resin E was substantially completely dissolved in the dimethylpolysiloxane to form a homogeneous solution.

COMPARATIVE EXAMPLE 2

To 100 parts of methylmethoxypolysiloxane (KC-89 commercially available from Shin-Etsu Chemical Co., Ltd.) was added 5 parts of butyltitanate homopolymer (TBT-700 commercially available from Nippon Soda K.K.). They were mixed to form a resin F.

Using each of the foregoing resins A to F, the following experiments were carried out.

EXAMPLE 5

10 parts of each resin, 10 parts of a platinum catalyst (CAT PL-50T commercially available from Shin-Etsu Chemical Co., Ltd.), and 50 parts of methylene chloride (or 50 parts of methyl isobutyl ketone for resin D) were mixed into a homogeneous solution. The solution was atomized through a spray dryer to form platinum catalyst-containing microcapsules having a particle size of 1 to 3 μm and containing 0.5% by weight of platinum atom.

The microcapsules, 0.12 parts, were added to a composition of the following components.

| Components | Parts by weight |
|---|---|
| 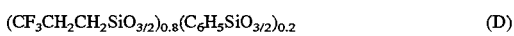 CH₂=CHSiO(SiO)₃₈₀SiCH=CH₂ (with CH₃ groups) | 100 |
| (CH₃)₃SiO(SiO)₂₀(SiO)₁₈Si(CH₃)₃ (with H, CH₃ groups) | 1.24 |
| fumed silica treated with hexamethyldisilazane | 20 |
| 50% toluene solution of 1-ethylnyl-1-cyclohexanol | 0.02 |

The ingredients were uniformly dispersed by means of a universal mixer. The composition as prepared was measured for viscosity (poise) at 25° C. (initial viscosity). The composition was stored at 25° C. for one month before it was examined for storage stability by measuring its viscosity again. The composition as prepared was also examined for curing property by heating the composition at 150° C. to start hydrosilylation whereupon the composition gradually increased its torque as measured by a rheometer. T10 and T90 are the times taken from the start until the torque reaches 10% and 90% of the maximum torque, respectively.

For comparison purposes, 0.12 parts of the platinum catalyst (PL-50T) instead of the microcapsules was added to the same composition as above. The composition was similarly examined for curing property and storage stability.

The results are shown in Table 1.

TABLE 1

| | Microcapsulated platinum catalyst | | | | | Platinum catalyst as such |
|---|---|---|---|---|---|---|
| | Resin A | Resin B | Resin C | Resin D | Resin E | |
| Curing property | | | | | | |
| T10, sec. | 23 | 25 | 22 | 21 | 13 | 8 |
| T90, sec. | 69 | 70 | 66 | 57 | 42 | 22 |
| Storage stability | | | | | | |
| Initial viscosity, poise | 2500 | 2700 | 2500 | 2600 | 2600 | 2700 |
| Aged viscosity, poise | 4700 | 4400 | 5000 | 5500 | gelled after 14 days | gelled after 12 hours |

As is evident from Table 1, by microcapsulating the platinum catalyst with any of silicone resin A to D within the scope of the invention, the addition type organopolysiloxane composition is significantly improved in storage stability without adversely affecting curability.

EXAMPLE 6

A mixture of 20 parts of each of Resins A, C, D and E and 80 parts of methyl isobutyl ketone was cast onto a steel plate to form a silicone coating having a dry thickness of about 5 μm. The coatings were measured for a contact angle with water both at the initial and after exposure in a sunshine weatherometer for 1,000 hours.

For comparison purposes, Resin F was cast onto a steel plate to form a coating which was similarly measured for a contact angle with water.

The results are shown in Table 2.

TABLE 2

|  | Resin A | Resin C | Resin D | Resin E | Resin F |
|---|---|---|---|---|---|
| Initial contact angle | 89° | 88° | 95° | 81° | 90° |
| After weathering |  |  |  |  |  |
| Outer appearance | Norma | Normal | Normal | Choking | Normal |
| Contact angle | 88° | 87° | 95° | 70° | 83° |

As is evident from Table 2, silicone resins A, C and D within the scope of the invention are fully resistant against weathering.

Japanese Patent Application No. 5-340046 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A thermoplastic fluorosilicone resin having the following average compositional formula (1):

$$(RfCH_2CH_2SiO_{3/2})_x(C_6H_5SiO_{3/2})_y(SiO_2)_z \qquad (1)$$

wherein Rf is a perfluoroalkyl group having 1 to 10 carbon atoms, and letters x, y, and z are positive numbers in the range: $0.2 \leq x \leq 0.95$, $0 < y \leq 0.8$, $0 \leq z \leq 0.05$, and $x+y+z=1$, said resin having a softening point in the range of 50° to 200° C.

2. The thermoplastic fluorosilicone resin of claim 1 which is blended with a platinum catalyst.

3. The thermoplastic fluorosilicone resin of claim 1, wherein the perfluoroalkyl group is represented by the formula $C_nF_{2n+1}$ wherein n is an integer of 1 to 10.

4. The thermoplastic fluorosilicone resin of claim 1, wherein $0.5 \leq x \leq 0.9$ and $0.1 \leq y \leq 0.5$.

5. The thermoplastic fluorosilicone resin of claim 1, wherein said resin has a softening point in the range of 70° to 150° C.

6. The thermoplastic fluorosilicone resin of claim 1, wherein said resin has a molecular weight of about 2,000 to about 50,000.

* * * * *